(12) United States Patent
Sauermann

(10) Patent No.: US 10,864,874 B2
(45) Date of Patent: Dec. 15, 2020

(54) RESTRAINT SYSTEM FOR A DRIVER OF A VEHICLE

(71) Applicant: HSM Hans Sauermann GmbH & Co. KG, Emsgaden (DE)

(72) Inventor: Johann Sauermann, Emsgaden (DE)

(73) Assignee: HSM HANS SAUERMANN GMBH & CO. KG, Ernsgaden (DE)

( * ) Notice: Subject to any disclaimer, the term of this patent is extended or adjusted under 35 U.S.C. 154(b) by 188 days.

(21) Appl. No.: 16/142,061

(22) Filed: Sep. 26, 2018

(65) Prior Publication Data
US 2019/0092259 A1    Mar. 28, 2019

(30) Foreign Application Priority Data
Sep. 28, 2017   (DE) .................. 20 2017 005 064 U

(51) Int. Cl.
*B60R 21/02* (2006.01)
*B60R 21/00* (2006.01)

(52) U.S. Cl.
CPC ...... *B60R 21/02* (2013.01); *B60R 2021/0074* (2013.01); *B60R 2021/0079* (2013.01); *B60R 2021/0206* (2013.01); *B60R 2021/0246* (2013.01)

(58) Field of Classification Search
CPC .................. B60R 21/015; B60R 21/02; B60R 2021/0246; B60R 2021/028; B60R 2021/0079; B60R 2021/0206; B60R 2021/0074

See application file for complete search history.

(56) References Cited

U.S. PATENT DOCUMENTS

| | | | | |
|---|---|---|---|---|
| 2,805,081 A * | 9/1957 | Frimet | .................... | B60R 21/02 280/748 |
| 3,640,572 A * | 2/1972 | Doehler | .................. | B60R 21/02 297/488 |
| 4,388,980 A * | 6/1983 | Vig | ......................... | B60R 21/02 180/269 |
| 4,391,344 A * | 7/1983 | Weber | .................... | B60R 21/02 180/269 |
| 4,392,660 A * | 7/1983 | Mason | .................. | B60J 5/0487 105/440 |
| 4,397,371 A * | 8/1983 | Lynnes | .................... | B60R 21/02 180/269 |
| 4,579,191 A * | 4/1986 | Klee | ....................... | B60J 5/0487 180/268 |
| 5,050,700 A * | 9/1991 | Kim | ........................ | B60R 21/02 180/268 |
| 5,542,493 A * | 8/1996 | Jacobson | ................ | B60K 28/04 180/272 |
| 6,299,207 B1 * | 10/2001 | Bares | ...................... | B60R 21/02 180/268 |
| 6,431,303 B1 * | 8/2002 | Muraro | .................. | B60R 21/02 180/268 |
| 2002/0153718 A1 * | 10/2002 | Schneider | ............... | B60J 5/042 280/748 |

(Continued)

*Primary Examiner* — Barry Gooden, Jr.
(74) *Attorney, Agent, or Firm* — Epstein Drangel LLP; Robert L. Epstein

(57) ABSTRACT

A restraint system for a driver of a vehicle comprises at least one protective bar (6), being supported on at least one pillar (2). To achieve an alignment, at least one protective bar (6) is pivotably supported by at least one eccentric (8). The protective bar is lockable.

12 Claims, 1 Drawing Sheet

(56) References Cited

U.S. PATENT DOCUMENTS

| | | | | |
|---|---|---|---|---|
| 2003/0088906 A1* | 5/2003 | Baker | ............... | A42B 3/0473 |
| | | | | 2/416 |
| 2005/0275275 A1* | 12/2005 | Muller | ................. | B60R 22/02 |
| | | | | 297/464 |
| 2008/0149017 A1* | 6/2008 | Blum | .................. | B60R 21/02 |
| | | | | 114/343 |
| 2009/0195024 A1* | 8/2009 | Cott | .................. | E02F 3/3414 |
| | | | | 296/190.08 |
| 2020/0086818 A1* | 3/2020 | Sheets | ................. | B60R 21/02 |

* cited by examiner

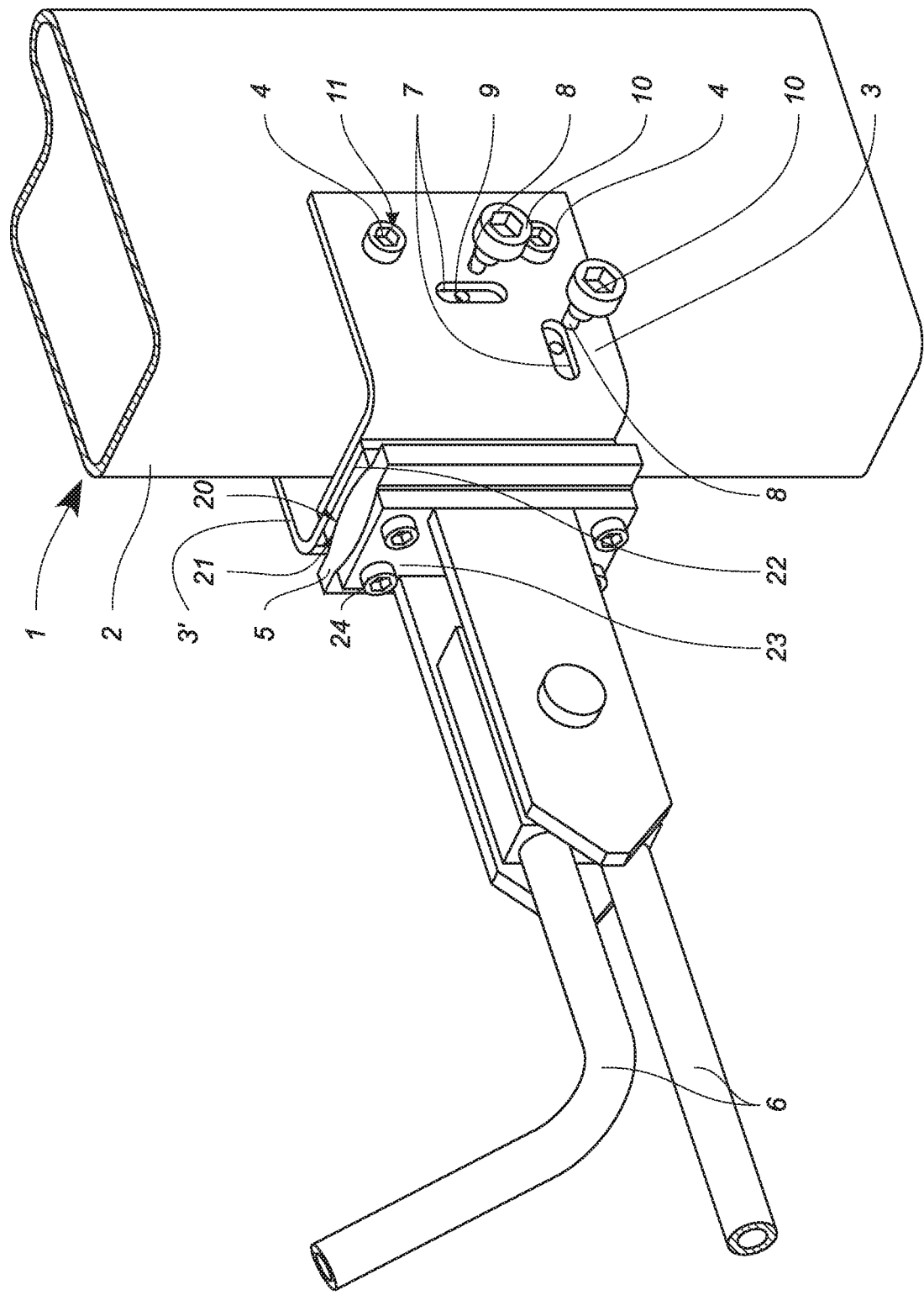

RESTRAINT SYSTEM FOR A DRIVER OF A VEHICLE

The present application claims priority to German Utility model application no: DE 20 2017 005 064.1, filed Sep. 28, 2017.

FIELD OF THE INVENTION

The invention relates to a restraint system for a driver of a vehicle, in particular of an industrial truck. Said restraint system comprises at least one protective bar which is supported on at least one pillar of the vehicle.

DESCRIPTION OF THE PRIOR ART

A generic restraint system is disclosed in EP 50106605-B. Said restraint system comprises a protective bar which is supported on a rear pillar of an industrial truck. Said protective bar is pivotable between a substantially horizontal restraint position and a substantially vertical released position in order to permit, on the one hand, a secure restraining action and, on the other hand, easy climbing in and/or out of the vehicle. In practice, this restraint system has been repeatedly proved to be expedient and forms the starting point of the present invention.

The object of the invention is to provide a restraint system of the type mentioned in the introduction which may be easily adapted to different vehicle geometries.

This object is achieved according to the invention by the following features:

BRIEF SUMMARY OF THE INVENTION

The restraint system according to the invention comprises at least one protective bar. In this case, in principle, for climbing in and out of the vehicle it is of no significance whether said at least one protective bar is pivotable or rigid. Generally, only the access on the driver's side is protected by a pivotable protective bar, whilst the opposing side is secured by a fixed protective bar. Moreover, it is also irrelevant whether the at least one protective bar is free at one end or supported at both ends on pillars. The present subject of the invention is applicable to all cited cases. It has been shown that the driver's cabs of vehicles are subjected to increasingly greater tolerances. This also relates, in particular, to the pillars which generally retain a cab roof. These pillars are frequently configured to be very thin-walled and twist during the assembly of the vehicle. However, after the restraint system is secured to at least one of the pillars, even slight twisting of the pillars leads to large errors in alignment of the at least one protective bar. In extreme cases, these errors in alignment may have the result that the at least one protective bar protrudes so far to the side out of the vehicle that said protective bar may become damaged during manoeuvring. Alternatively, when twisted in the opposing direction the protective bar may also considerably limit the freedom of movement of the driver. These problems are intended to be solved by the present subject of the invention. To this end, at least one eccentric is provided, the at least one protective bar being able to be aligned thereby relative to the at least one pillar to which said protective bar is fastened. Thus by rotating the at least one eccentric the angular position of the at least one protective bar may be adjusted in order to compensate in this manner for production tolerances of the at least one pillar. The at least one eccentric has the particular advantage relative to other adjusting options that it acts in a self-locking manner. As a result, in the case of an accident it is prevented that the at least one protective bar is pivoted outwardly and that at the same time the required protective effect is lost. In this manner, the at least one eccentric ensures the required high degree of stability of the connection between the at least one protective bar and the at least one pillar. Additionally, the at least one protective bar is also lockable by at least one retaining means. The at least one retaining means is preferably in this case a screw but may also be implemented in a different manner. This additional retaining means provides the connection between the at least one protective bar and the at least one pillar with additional stability and, in particular, prevents an inadvertent adjustment of the at least one eccentric.

Preferably, the at least one pillar is encompassed by at least one bracket which comprises at least one slot. The at least one eccentric engages in this at least one slot in order to carry out an adjustment of the at least one protective bar transversely to the longitudinal extent of the at least one slot. This design is particularly simple and may also be integrated cost-effectively in restraint systems which are already in existence.

Since primarily an alignment of the at least one protective bar about an approximately vertical axis is important, the at least one slot is configured to be parallel to the at least one pillar+/−30°. If, however, an alignment of the at least one protective bar is intended to take place about a horizontal axis, the slot should be aligned substantially horizontally. The internal planar surfaces of the at least one slot in any case ensure that only one movement component is transmitted to the at least one protective bar by the rotational alignment of the at least one eccentric. This permits an accurate adjustment of the at least one protective bar relative to the at least one pillar.

For critical applications it is advantageous if at least two of the eccentrics are provided, said eccentrics aligning the at least one protective bar in different pivoting directions.

Alternatively or additionally, it is advantageous if a surface which is curved in a concave manner is provided on the at least one pillar. This surface which is curved in a concave manner is formed in this case so as to be adapted to at least one surface which is curved in a convex manner of at least one support of the at least one protective bar. This results in an advantageous pivot axis for the at least one protective bar, in order to be able to pivot this protective bar in a simple manner. Due to the pivot axis which is forcibly produced, the pivoting of the at least one protective bar may be carried out in a relatively simple manner for the purposes of adjustment. If the aforementioned at least one eccentric is additionally provided, these curved surfaces result in a particularly sensitive angular adjustment by the at least one eccentric. Moreover, this results in the advantage that when pivoting the at least one protective bar the at least one pillar is not subjected to any frictional forces. Thus damage to the at least one pillar when pivoting the at least one protective bar is eliminated.

The surface which is curved in a concave manner is preferably of a hollow-cylindrical shape. This results in a clearly defined pivot axis which is defined by the cylinder axis of the hollow cylinder.

In order to be able to fix the support of the at least one protective bar securely to the at least one pillar, it is also advantageous if the at least one support is shaped so as to be curved on either side. In this manner, the at least one support may be easily retained in a clamped manner between jaws, at least one thereof being fixedly supported on the at least one pillar.

Finally, for the secure fixing of the at least one support it is advantageous if the at least one support is penetrated by at least one retaining means which clamps the jaws against one another. This results in an advantageous pressing action of the jaws against the at least one support, so that the connection of the at least one support to the at least one pillar is optimal.

Other advantages and characteristics of this invention will be explained in the detailed description below with reference to the associated FIGURE that contains an embodiment of this invention. It should however be understood, that the FIGURE is just used to illustrate the invention and does not limit the scope of protection of the invention.

BRIEF DESCRIPTION OF DRAWING

The drawing shows a preferred embodiment according to the invention.

DETAILED DESCRIPTION OF THE INVENTION

The only FIGURE shows a three-dimensional view of a detail of an industrial truck 1, substantially only one pillar 2 thereof being visible. Two brackets 3, 3' are secured to this pillar 2 by means of screws 4. As an alternative to the screws 4, the bracket 3 may also be configured as a clamp so as to avoid in this manner drilling into the pillar 2. This may be significant, in particular, in the case of pillars 2 which are configured to be thin. A support 5 which bears a pivotable protective bar 6 is supported on the bracket 3.

Moreover, a slot 7 is provided in the bracket 3, an eccentric 8 engaging in said slot. This eccentric 8 is supported on a threaded bore 9 of the pillar 2. By rotating the eccentric 8 an eccentric head 10 produces a rotational movement which is transmitted to the slot 7. The vertical component of this rotational movement is eliminated in this case by the slot 7 and only the horizontal movement component is transmitted to the bracket 3. In this manner, the bracket 3 is pivoted slightly about a substantially vertical axis in order to align in this manner the protective bar 6 correctly on the industrial truck 1. The screws 4 form in this case an additional retaining means 11 which secures the eccentric position.

The support 5 is configured to be lenticular and on either side has surfaces 20 which are curved in a convex manner and which are configured to be substantially circular cylindrical. In the bearing region of the support 5, the bracket 3' is configured with a concave surface 21 which is adapted to the convex surface 20 of the support 5. This concave surface 21 forms a jaw 22 which is fixedly connected to the bracket 3'. A further jaw 23 which opposes this jaw 22 is provided, said further jaw also comprising a concave surface 21 which is configured so as to be adapted to the convex surface 20 of the support 5. The jaws 22, 23 and the support 5 are penetrated by retaining means 24 in order to fix the entire arrangement. This results in an advantageous pivot axis in order to be able to adjust the protective bar 6.

Since some of the embodiments of this invention are not shown or described, it should be understood that a great number of changes and modifications of these embodiments is conceivable without departing from the rationale and scope of protection of the invention as defined by the claims.

LIST OF REFERENCE NUMERALS

1 Industrial truck
2 Pillar
3, 3' Bracket
4 Screw
5 Support
6 Protective bar
7 Slot
8 Eccentric
9 Threaded bore
10 Eccentric head
11 Retaining means
20 Convex surface
21 Concave surface
22 Jaw
23 Jaw
24 Retaining means

The invention claimed is:

1. A restraint system for a driver of a vehicle, including an industrial truck, wherein said restraint system comprises at least one protective bar which is supported on at least one pillar of said vehicle, said at least one protective bar is pivotably supported by means of at least one eccentric relative to said at least one pillar in order to be aligned relative to said at least one pillar, wherein said at least one protective bar is pivotably lockable by at least one retaining means.

2. The restraint system according to claim 1, wherein at least two of said at least one eccentric are provided for different pivoting directions.

3. The restraint system according to claim 1, wherein said at least one pillar is encompassed by at least one bracket which comprises at least one slot and said at least one eccentric engaging in said slot.

4. The restraint system according to claim 3, wherein said at least one slot is aligned parallel to said at least one pillar +/−30'.

5. The restraint system according to claim 1, wherein said at least one pillar comprises at least one first surface which is curved in a concave manner, and said at least one support of said at least one protective bar comprises at least one second surface which is curved in a convex manner, said at least one first surface being formed to be adapted to said at least one second surface in order to produce a pivot axis for said at least one protective bar.

6. The restraint system according to claim 5, wherein said at least one second surface which is curved in the convex manner is configured to be at least partially cylindrical.

7. The restraint system according to claim 5, further comprising jaws, wherein said at least one support is curved on either side and is retained in a clamped manner between said jaws, at least one of said jaws being supported on said at least one pillar.

8. The restraint system according to claim 7, wherein said at least one support is penetrated by at least one retaining means which clamps said jaws against one another.

9. A restraint system for a driver of a vehicle, including an industrial truck, wherein said restraint system comprises at least one protective bar which is supported on at least one pillar of said vehicle, wherein said at least one pillar comprises at least one first surface which is curved in a concave manner, and said at least one support of said at least one protective bar comprises at least one second surface which is curved in a convex manner, said at least one first surface being formed to be adapted to said at least one second surface in order to produce a pivot axis for said at least one protective bar.

10. The restraint system according to claim 9, wherein said at least one second surface which is curved in convex manner is configured to be at least partially cylindrical.

11. The restraint system according to claim 9, further comprising jaws, wherein said at least one support is curved on either side and is retained in a clamped manner between said jaws, at least one of said jaws being supported on said at least one pillar.

12. The restraint system according to claim 11, wherein said at least one support is penetrated by at least one retaining means which clamps said jaws against one another.

\* \* \* \* \*

UNITED STATES PATENT AND TRADEMARK OFFICE
CERTIFICATE OF CORRECTION

| | | |
|---|---|---|
| PATENT NO. | : 10,864,874 B2 | Page 1 of 1 |
| APPLICATION NO. | : 16/142061 | |
| DATED | : December 15, 2020 | |
| INVENTOR(S) | : Johann Sauermann | |

It is certified that error appears in the above-identified patent and that said Letters Patent is hereby corrected as shown below:

On the Title Page

Item (73) Assignee: change "HSM HANS SAUERMANN GMBH & CO. KG, Ernsgaden (DE)" to read as --HSM GMBH & CO. KG, Ernsgaden (DE)--

Signed and Sealed this
Fourth Day of January, 2022

Drew Hirshfeld
*Performing the Functions and Duties of the*
*Under Secretary of Commerce for Intellectual Property and*
*Director of the United States Patent and Trademark Office*